(12) United States Patent
Cheung et al.

(10) Patent No.: US 10,765,262 B2
(45) Date of Patent: Sep. 8, 2020

(54) ROTARY CUTTING MACHINE

(71) Applicant: Huiyang Allan Plastic & Electric Industries Co., Limited, Huizhou (CN)

(72) Inventors: Shu Sang Cheung, Huizhou (CN); Gang Zhi Liu, Huizhou (CN)

(73) Assignee: Huiyang Allan Plastic & Electric Industries Co., Limited, Guangdong (CN)

( * ) Notice: Subject to any disclaimer, the term of this patent is extended or adjusted under 35 U.S.C. 154(b) by 237 days.

(21) Appl. No.: 16/033,103

(22) Filed: Jul. 11, 2018

(65) Prior Publication Data

US 2019/0014947 A1 Jan. 17, 2019

(30) Foreign Application Priority Data

Jul. 14, 2017 (CN) .......................... 2017 1 0575625

(51) Int. Cl.
| | |
|---|---|
| *A47J 43/00* | (2006.01) |
| *A47J 43/25* | (2006.01) |
| *A47J 27/04* | (2006.01) |
| *A47J 36/32* | (2006.01) |
| *A47J 43/07* | (2006.01) |

(Continued)

(52) U.S. Cl.
CPC .............. *A47J 43/255* (2013.01); *A47J 27/04* (2013.01); *A47J 36/32* (2013.01); *A47J 43/07* (2013.01); *A47J 43/0722* (2013.01); *A47J 43/085* (2013.01); *A47J 43/25* (2013.01); *B02C 18/182* (2013.01); *B02C 18/186* (2013.01);

(Continued)

(58) Field of Classification Search
CPC ...... A47J 43/255; A47J 43/25; A47J 43/0722; A47J 43/046; A47J 43/07; B26D 3/11
USPC ........................................................ 241/169.1
See application file for complete search history.

(56) References Cited

U.S. PATENT DOCUMENTS 4,906,486 A * 3/1990 Young .................... A23G 9/045
                                                                241/169.1
5,261,613 A * 11/1993 Mullarky .............. A47J 43/255
                                                                241/169.1

(Continued)

*Primary Examiner* — Faye Francis
(74) *Attorney, Agent, or Firm* — Intellectual Property Law Group LLP

(57) ABSTRACT

A rotary cutting machine, having a body base, wherein the body base is provided with a shredding and cutting component capable of rotating about the motor axis by 90°; and a power unit for powering the shredding cutter components. The power unit is connected to the shredding and cutting component, and the connector for connecting the power unit is provided on one side of the shredder tube, which having a shredder tube and a feed tube, wherein the feed tube is vertically arranged with the shredder tube. The shredder tube having a shredder tube shell. The strip cutter supporter is arranged in the shredder tube shell, the strip cutter is arranged on the side of the strip cutter support, and the spiral cutter support is clamped on the bottom surface of the strip cutter support, the spiral cutter is arranged on the spiral cutter support, the strip cutter and the spiral cutter are arranged perpendicular to each other. The rotary cutting machine integrates a strip cutter and a spiral cutter in a shredder tube shell, and integrates the two kinds of cuts with different output power modes to facilitate the conversion between the strip cutting and spiral cutting modes.

20 Claims, 8 Drawing Sheets

(51) Int. Cl.
*B26D 3/11* (2006.01)
*A47J 43/08* (2006.01)
*B02C 18/18* (2006.01)
*A47J 43/046* (2006.01)
*B26D 11/00* (2006.01)

(52) U.S. Cl.
CPC .............. *B26D 3/11* (2013.01); *A47J 43/046* (2013.01); *A47J 2027/043* (2013.01); *B26D 2011/005* (2013.01)

(56) References Cited

U.S. PATENT DOCUMENTS

| | | | | |
|---|---|---|---|---|
| 5,364,037 A * | 11/1994 | Bigelow | ............... | A47J 43/255 241/169.1 |
| 5,660,341 A * | 8/1997 | Perkins | ................. | A47J 43/255 241/169.1 |
| 5,680,997 A * | 10/1997 | Hedrington | ........... | A47J 43/255 241/169.1 |
| 5,803,378 A * | 9/1998 | Wolters | ................. | A47J 43/255 241/100 |
| 6,244,529 B1 * | 6/2001 | Tardif | ................... | A47J 43/255 241/100 |
| 6,766,731 B1 * | 7/2004 | Lavi | ...................... | A47J 43/255 241/37.5 |
| 6,915,973 B2 * | 7/2005 | So | ......................... | A47J 43/255 241/168 |
| 7,137,581 B2 * | 11/2006 | Takayama | ............. | A47J 43/255 241/169.1 |
| 7,337,997 B2 * | 3/2008 | Ko | ........................ | A47J 43/255 241/168 |
| 7,637,445 B2 * | 12/2009 | So | ......................... | A47J 43/255 241/169.1 |
| 8,567,704 B2 * | 10/2013 | Bagley | .................. | A47J 43/255 241/169.1 |
| 8,579,852 B2 * | 11/2013 | Memar | ................. | A61B 17/322 241/169.1 |
| 8,973,854 B2 * | 3/2015 | Ebrahim | ............... | A47J 43/255 241/169.1 |
| 9,655,475 B2 * | 5/2017 | Bordes | .................. | A47J 43/255 |
| 2008/0116306 A1 * | 5/2008 | Ko | ........................... | B26D 1/36 241/93 |
| 2010/0270406 A1 * | 10/2010 | Grace | ................... | A47J 43/255 241/93 |
| 2013/0206886 A1 * | 8/2013 | Rouyer | .................... | A47J 43/07 241/220 |
| 2013/0263716 A1 * | 10/2013 | Rouyer | .................. | B02C 18/16 83/651 |

* cited by examiner

ROTARY CUTTING MACHINE

CROSS-REFERENCE TO RELATED APPLICATION

This application claims benefit of China patent application no. 201710575625.4 filed Jul. 14, 2017, the disclosure of which is hereby incorporated by reference in its entirety for all purposes.

BACKGROUND OF THE INVENTION

1. Field of Invention

The present invention relates to food processors, and in particular to shredding and cutting components for rotary cutting machines and rotary cutting machines using said components.

2. Background

Conventional food processors are typically used to perform tasks such as chopping, slicing, or shredding of food. However, the shredding or cutting components of conventional food processors can only perform one such task (e.g. chopping, slicing, shredding) at a time. Therefore, in order to perform different tasks with the food processor, the user must replace the shredding or cutting component. This requirement to continually swap the shredding or cutting component of the food processor is time consuming and makes it difficult to cut different sizes of strips, or a continuous spiral ribbon using the same food processor.

In addition, different food processing tasks have different power output directions, which can mean that different machines are required for each task. As a result, if a user wishes to carry out a range of different food processing tasks the cost of the food processor is increased. Another disadvantage is the need for frequent replacement of the shredding/cutting components. This make the operation procedure complicated, as well as a potential safety hazard because the user may hurt themselves when replacing the shredding/cutting components.

SUMMARY OF THE INVENTION

Accordingly, the present invention is directed to a combined shredding/cutting component for a rotary cutting machine and a rotary cutting machine comprising the combined shredding/cutting component, both of which substantially obviate one or more of the problems resulting from the limitations and disadvantages of the prior art.

The present invention provides a combined shredding and cutting component for a rotary cutting machine. The component has a shredder tube and a feed tube, wherein the feed tube is arranged perpendicular to the shredder tube. The shredder tube comprises a strip cutter support arranged within a shredder tube shell, the strip cutter support having a strip cutter provided on a side thereof and a spiral cutter support provided on a bottom surface thereof; and wherein a spiral cutter is provided on the spiral cutter support such that the strip cutter and the spiral cutter are positioned perpendicular to each other.

Preferably, the strip cutter support may comprise a cylinder that is open at both ends with two installation positions symmetrically provided on the side wall of the cylinder for installing the strip cutter; and wherein the shape of the strip cutter is complementary to the installation positions on the side wall of the cylinder.

Preferably, the spiral cutter may comprise: a cutter disk configured to be received on the spiral cutter support; a core cutter protruding from the cutter disk along a central axis thereof; a slot formed between an outer edge of the cutter disk and the core cutter; a slice cutter support protruding from the cutter disk along a first side of the slot; a slice cutter arranged on the slice cutter support parallel to the cutter disk; a triangle cutter arranged equidistant from and parallel to slice cutter support on a second side of the slot; and wherein the triangle cutter and the slice cutter are arranged perpendicular to each other.

The present invention also provides a rotary cutting machine, in particular the rotary cutting machine comprises a body base and a combined shredding and cutting component according to an embodiment of the present invention. The body base comprises a power unit that drives the combined shredding and cutting component via a motor axis connected to the combined shredding and cutting component by a connector provided on one side of the shredder tube; and wherein the body base is configured to allow the combined shredding and cutting component to be rotated about the motor axis by 90°.

Preferably, the power unit may comprise a drive unit and a transmission unit with a gear set box, and the transmission unit connects the drive unit and the connector.

Further preferably, the drive unit may include a motor, a motor shell and a motor lid; and wherein the motor lid is attached to the motor shell, and the motor shell is fixed on the body base.

In addition, preferably the transmission unit may comprise a drive shaft connected with the motor, and a gear set that meshes with the connector.

Further preferably, the gear set may be arranged in parallel with the drive shaft, and a front bearing and a rear bearing are respectively arranged at the front and the rear ends of the drive shaft.

Preferably, the gear set may be housed within the complementary gear set box; a first bushing and a second bushing are arranged on either side of the gear set box; and a gear lid is arranged between the first bushing and connector, and the gear set box is fixed on the body base.

Preferably, a first limit block and a second limit block may be provided on the body base so as to form an arc angle of 90°; and wherein a third limit block, arranged on outside of the gear set box, is configured to interact with the first and second limit blocks so as to limit the rotation of the gear set box relative to the body base to a 0-90° free rotation between the first limit block and the second limit block.

Preferably, an adjustment unit may be arranged on the outer periphery of the shredder tube shell, said unit comprising: an upper cover base provided on the shredder tube shell, with one end of the upper cover base extending beyond the strip cutter support and the other end of the upper cover base is connected to the feed tube; a locking device arranged on the upper cover base, the locking device having a spring rod sheathed with a first spring and a locking device lid having a limit slider with a second spring.

Preferably, the feed tube may be provided with a complementary pusher. Further preferably, the pusher comprises a first pusher element and a second pusher element matched with the size of the food to be processed, said first pusher element configured to be sheathed in the second pusher element.

The present invention provides a shredding and cutting component, which adds the spiral cutter to the bottom of the strip cutter, through a rotation conversion method, making it very convenient for a conversion between food shredding and spiralling. The operation method is simple, practical and easy to operate.

The present invention integrates a strip cutter and a spiral cutter in a shredder tube shell, and integrates the two kinds of cuts with different output power modes to facilitate the conversion of the strip cutter and the spiral cutter. The same machine can therefore be set up to produce food slices, or to produce spiral cuts.

These and other embodiments of the present invention are further made apparent, in the remainder of the present document, to those of ordinary skill in the art.

BRIEF DESCRIPTION OF DRAWINGS

In order to more fully describe embodiments of the present invention, reference is made to the accompanying drawings. These drawings are not to be considered limitations in the scope of the invention, but are merely illustrative.

DETAILED DESCRIPTION OF THE INVENTION

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention.

The present invention relates to a combined shredding and cutting component for a rotary cutting machine and a rotary cutting machine comprising said component. It is appreciated that the component and the rotary cutting machine comprising the component are particularly suitable for food processing.

Figure 1:
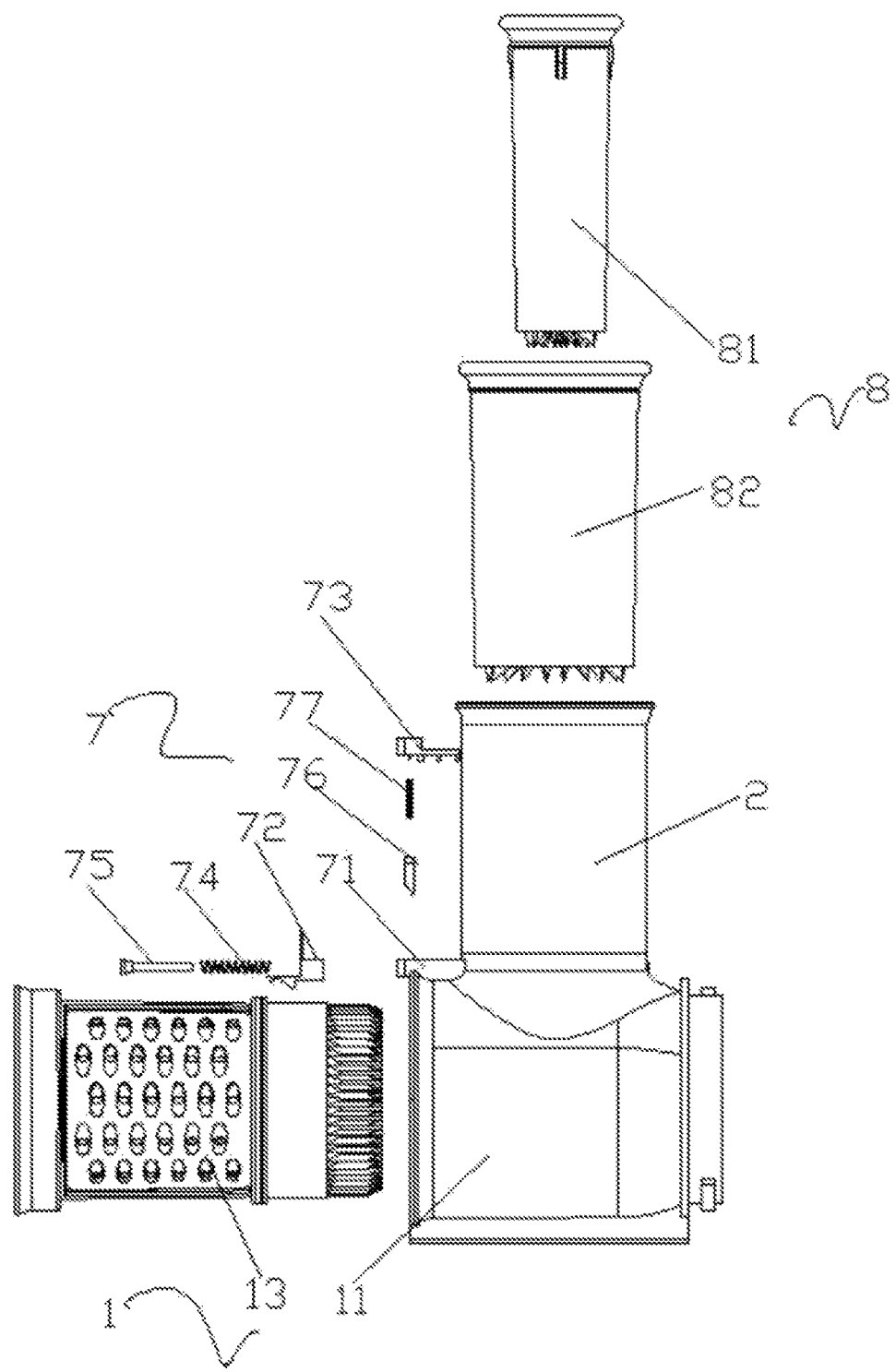
FIG. 1 is an exploded view of the overall structure of the combined shredding and cutting component, according to an embodiment of the present invention.
Figure 2:
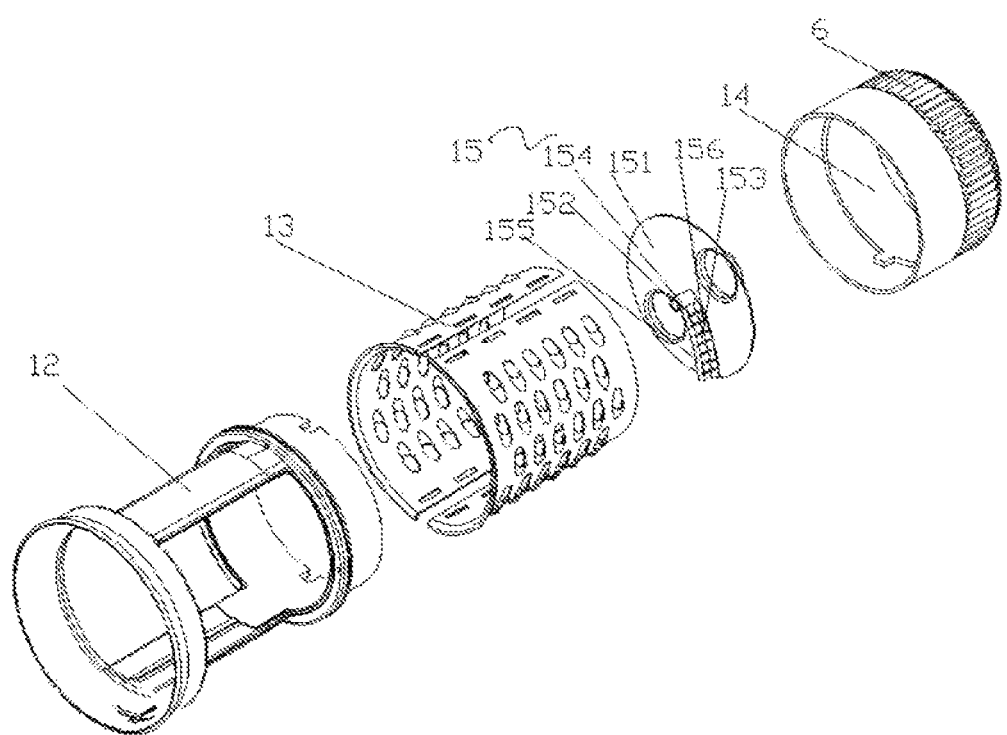
FIG. 2 is an exploded view of the local structure of the shredder tube of the combined shredding and cutting component, according to an embodiment of the present invention.
Figure 3:
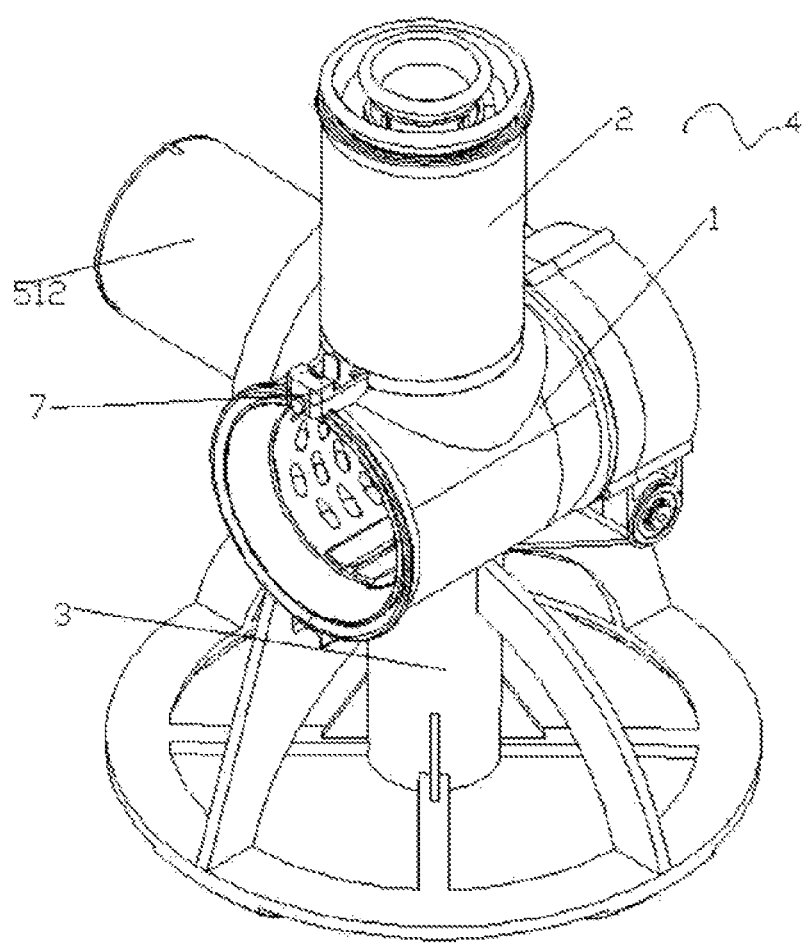
FIG. 3 is the schematic diagram of the overall structure of the rotary cutting machine, according to an embodiment of the present invention.
Figure 4:
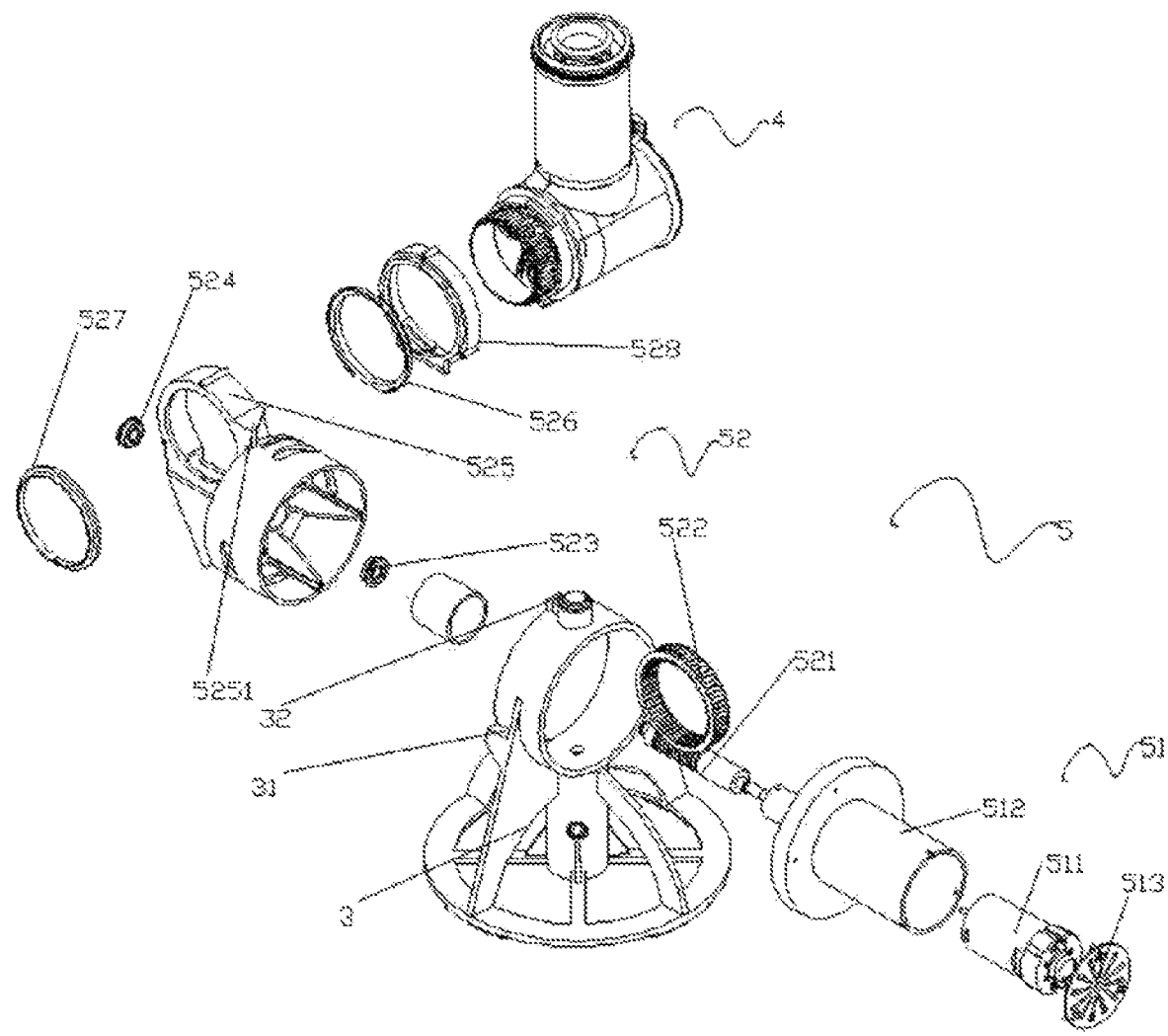
FIG. 4 is an exploded view of the overall structure of the rotary cutting machine when in the strip cutting orientation, according to an embodiment of the present invention.
Figure 5:
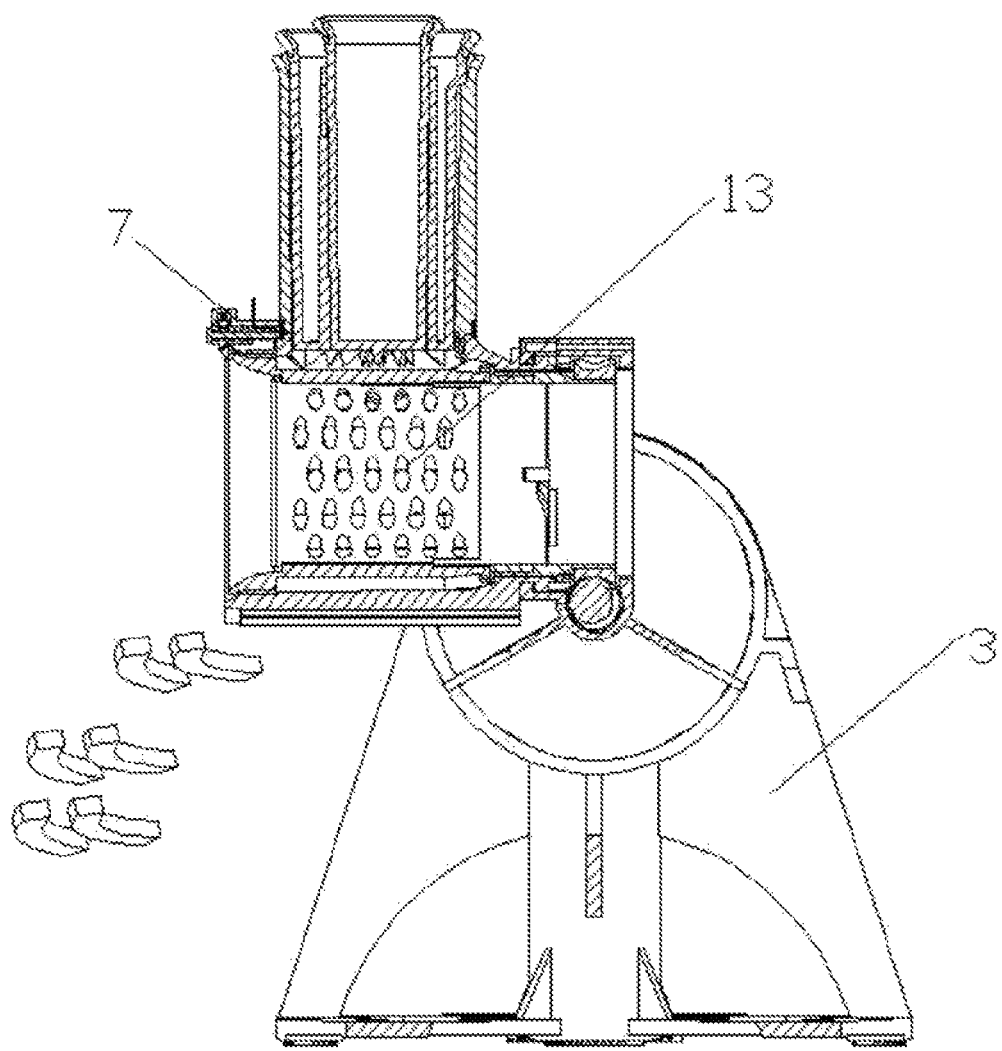
FIG. 5 is a cross-sectional view of the overall structure of the rotary cutting machine when in the strip cutting orientation, according to an embodiment of the present invention.
Figure 6:
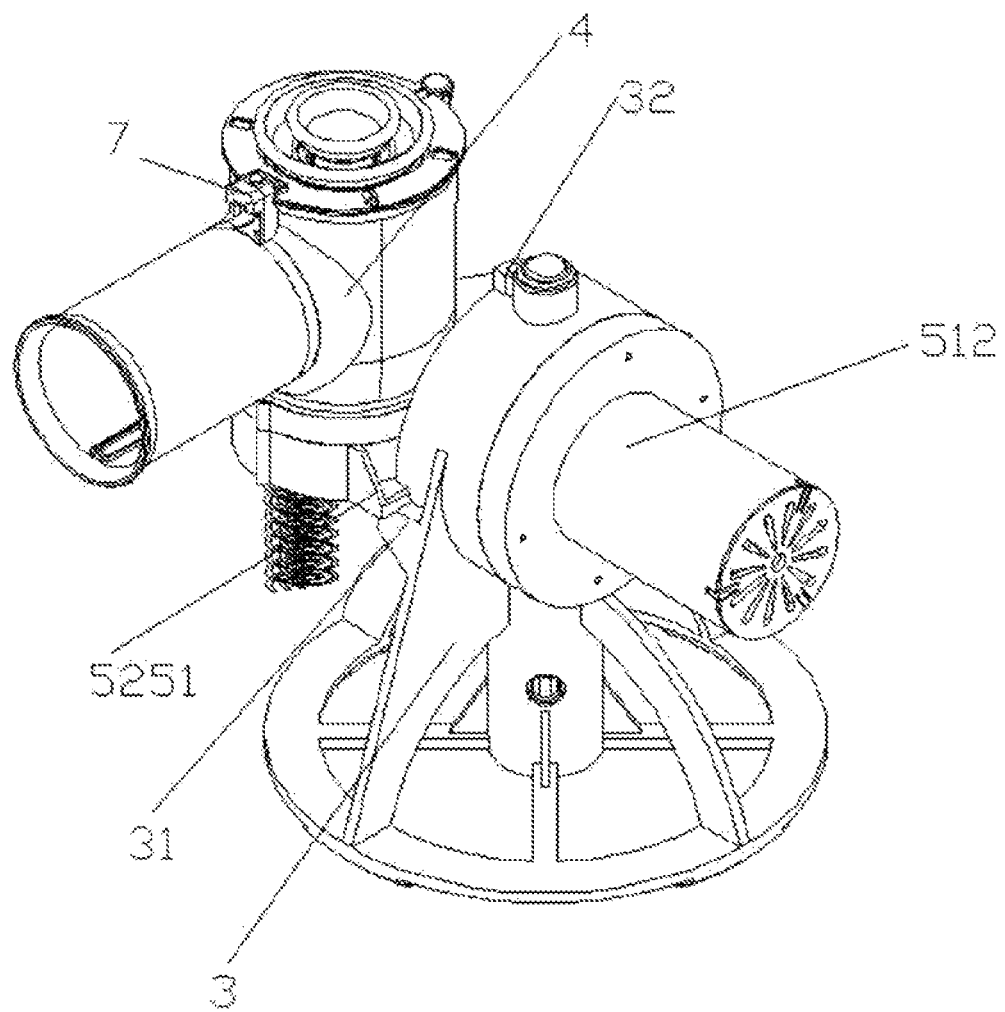
FIG. 6 is the schematic diagram of the overall structure of the rotary cutting machine of the present invention when in the spiral cutting orientation.
Figure 7:
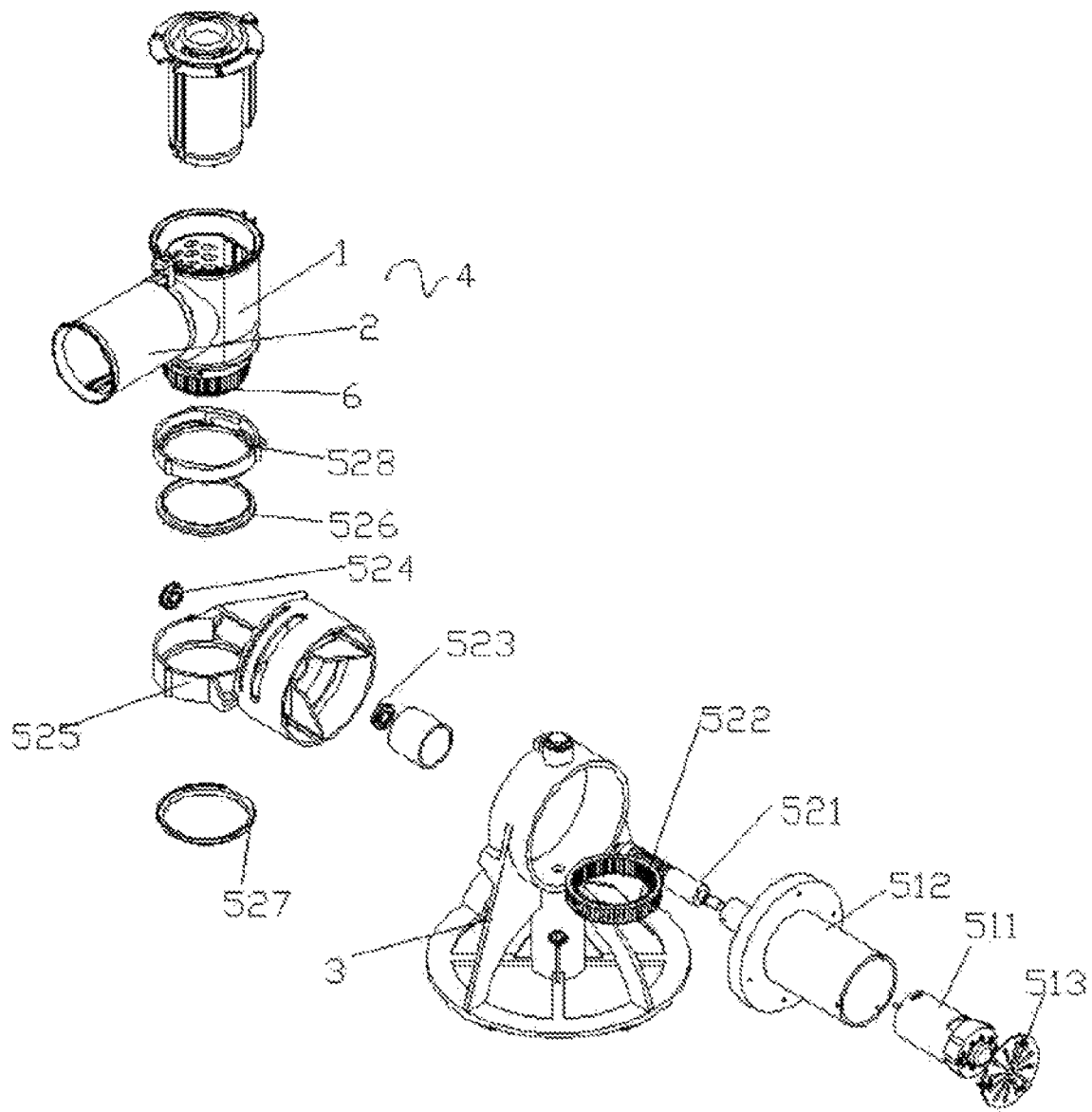
FIG. 7 is an exploded view of the overall structure of the rotary cutting machine when in the spiral cutting orientation, according to an embodiment of the present invention.
Figure 8:
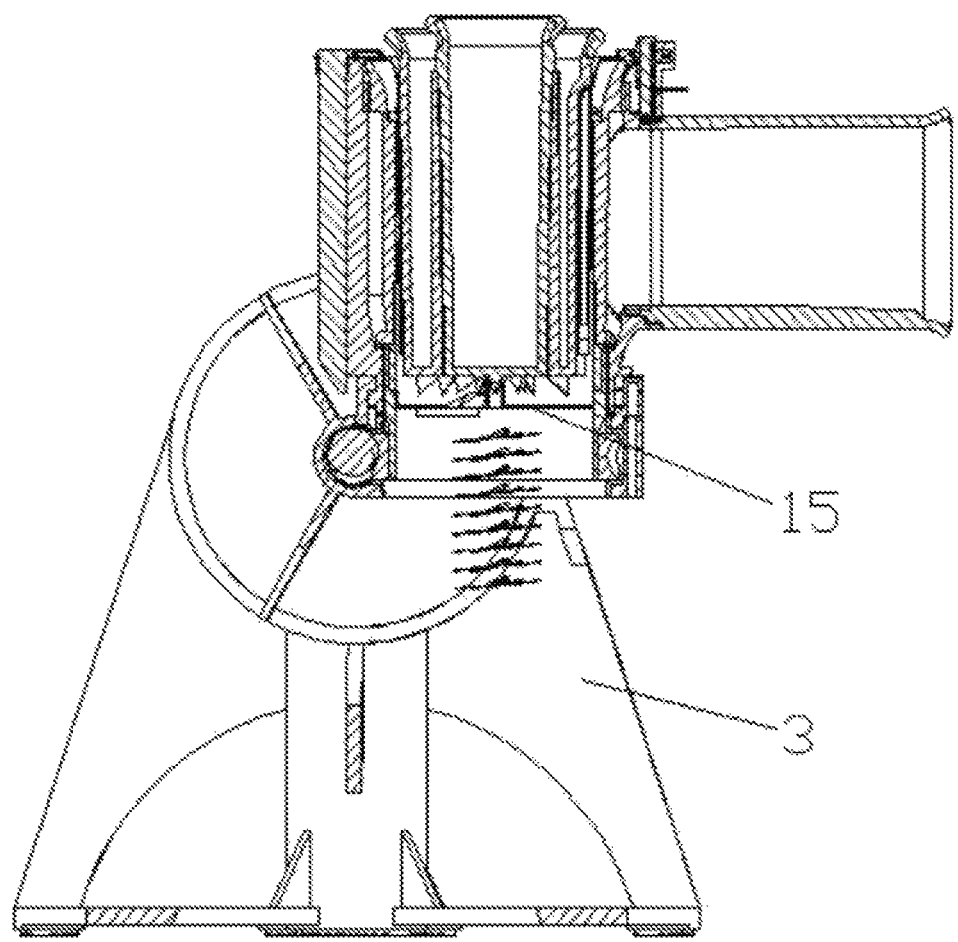
FIG. 8 is a cross-sectional view of the overall structure of the rotary cutting machine when in the spiral cutting orientation, according to an embodiment of the present invention.

As shown in FIGS. 1-2, the present invention discloses a combined shredding and cutting component, which comprises a shredder tube 1 and a feed tube 2, the feed tube is arranged perpendicular to the shredder tube, and the shredder tube comprises a shredder tube shell 11.

The strip cutter support 12 is arranged in the shredder tube shell, the strip cutter 13 is arranged on the side of the strip cutter support, and the spiral cutter support 14 is clamped on the bottom surface of the strip cutter support, the spiral cutter 15 is arranged on the spiral cutter support, the strip cutter and the spiral cutter are arranged perpendicular to each other.

The strip cutter support is a cylinder which is open at both ends. On the side wall of the cylinder, two installation positions for installing the strip cutter are symmetrically provided. The shape of the strip cutter matches the installation position on the side wall of the cylinder. There are two pieces of strip cutters, and each strip cutter is semi-cylindrical.

The spiral cutter 15 comprises a cutter disk 151 which is fixed on the spiral cutter support. The center of the shaft of the cutter disk is provided with a core cutter 152, a slot 153 is formed between the outer edge of the cutter disk and the core cutter, and a slice cutter supporter 154 is arranged on one side of the slot.

A slice cutter 155 is arranged on the slice cutter support, a triangle cutter 156 is arranged equidistant from and parallel to the slice cutter support on the other side of the slot of the cutter disk. The slice cutter support protrudes on the bottom surface of the cutter disk, and the slice cutter parallel to the bottom of the cutter disk. The triangle cutter and the slice cutter are arranged perpendicular to each other, and the core cutter protrudes from the triangular cutter.

When the shredder tube is oriented horizontally, the food is put into the feed tube and cut into strips. When the shredder tube is rotated to a vertical orientation and arranged vertically, the food is put into the feed tube and cut into a spiral.

The invention provides a shredding and cutting component, which adds the spiral cutter to the bottom of the strip cutter, through a rotation conversion method. In this way it is very convenient to convert between the food shredding mode and the food spiralling mode.

As shown in FIGS. 3-8, the present invention discloses a rotary cutting machine, comprising a body base 3, wherein the body base is provided with the combined shredding and cutting component 4 such that the component is capable of rotating about the motor axis of the base by 90°.

A power unit for powering the shredding cutter components is also provided. The power unit is connected to the combined shredding and cutting component. The connector 6 for connecting the power unit is provided on one side of the shredder tube. The transmission unit connects the drive unit and the connector.

The feed tube is provided with a complementary pusher 8, which can be inserted into the feed tube to urge food along the feed tube. The pusher 8 comprises a first pusher element 81 and a second pusher element 82 each of which can be selected to match the size of the food to be processed. The first pusher element can be at least partially sheathed in the second pusher element.

The combined shredding and cutting component comprising a shredder tube 1 and a feed tube 2, the feed tube is oriented perpendicular to the shredder tube. The feeding tube is a cylinder open at two ends, and the shredder tube comprises a shredder tube shell 11, the shredder tube shell is a cylinder that is open at both ends, and the side wall of the shredder tube shell passes through the lower end of the feed tube.

The strip cutter support 12 is arranged in the shredder tube shell, the strip cutter 13 is arranged on the side of the strip cutter support, and the spiral cutter support 14 is clamped on the bottom surface of the strip cutter support, the spiral cutter 15 is arranged on the spiral cutter support, the strip cutter and the spiral cutter are arranged perpendicular to each other.

The spiral cutter 15 comprises a cutter disk 151 which is fixed on the spiral cutter support. The centre of the shaft of the cutter disk is provided with a core cutter 152, a slot 153 is formed between the outer edge of the cutter disk and the core cutter, and a slice cutter support 154 is arranged on one side of the slot.

A slice cutter 155 is arranged on the slice cutter support, a triangle cutter 156 is arranged equidistant to and parallel to the slice cutter support on the other side of the slot of the cutter disk. The slice cutter support protrudes on the bottom surface of the cutter disk, and the slice cutter parallel to the bottom of the cutter disk. The triangle cutter and the slice cutter are arranged perpendicular to each other, and the core cutter protrudes from the triangular cutter.

The drive unit 51 includes a motor 511, a motor shell 512 and a motor lid 513. The motor lid is attached to the motor shell, and the motor shell is fixed on the body base. The transmission unit 52 comprises a drive shaft 521 connected with a motor, and the connector is provided with a gear set 522 that meshes with the connector.

The gear set is arranged in parallel with the drive shaft, and a front bearing 523 and a rear bearing 524 are respectively arranged at the front and the back ends of the drive shaft.

Outside the gear set, there is a gear set box 525 matched with the gear set, a first bushing 526 and a second bushing 527 are arranged on either side of the gear set box. The gear lid 528 is arranged between the first bushing and connector, and the gear set box is fixed on the base.

A first limit block 31 and a second limit block 32 are provided on the body base 3 so as to form an arc angle of 90°. The first limit block is in an "L" shape and the second limit block is convex block. A third limit block 5251, arranged outside the gear set box, is configured to interact with the first limit block and the second limit block so as to limit the rotation of the gear set box 525 relative to the body base 3 to a 0-90° free rotation between the first limit block and the second limit block. Preferably the third limit block is in an "L" shape.

When cutting the food into a spiral, the first limit block abuts the third limit block; this is the spiral cutting mode. In the strip cutting mode, the inner side of the third limit block abuts the second limit block.

An adjustment unit 7 is arranged on the outer periphery of the shredder tube shell. The adjusting unit comprises an upper cover base 71 fixed on the shredder tube shell. One end of the upper cover base extends beyond the strip cutter support, and the other end of the upper cover base is fixedly connected with the feed tube. The locking device 72 is arranged on the upper cover base, and the locking device lid 73 is arranged on the locking device. A first spring 74 and a spring rod 75 are provided in the locking device. The first spring is sheathed on the spring rod.

The locking device lid is provided with a limit slider 76 and a second spring 77. The second spring is arranged in the limit slider.

The main function of the adjustment unit is to safety lock the shredder tube in position.

In the food strip cutting mode the shredder tube is orientated horizontally. In this mode the inner side of the third limit block 5251 on the gear set box abuts with the second limit block 32 of the body base.

During operation food is inserted into the feed tube and, under the action of the motor, the power is transmitted to the connector through the transmission unit. The strip cutter is driven by the connector to rotate and the food is cut into strips by the strip cutter as the food is urged towards the strip cutter under the action of the pusher.

When the user wishes to operate the rotary cutting machine in the spiral cutting mode, the shredding and cutting component is rotated until the outer sides of the third limit block 5251 on the gear set box abuts the inner side of the first limit block 31 of the body base.

Foods can then be fed into the shredder tube and, under the action of the motor the power will be transmitted to the connector by the transmission unit. The spiral cutter is driven by the connector to rotate and the food is cut into a spiral by the spiral cutter as the food is urged towards the spiral cutter under the action of the pusher.

The present invention provides a rotary cutting machine for cutting strips and spirals on a single machine by rotating the shredding and cutting component without the need to replace the power unit and cutter unit. The rotary cutting machine can cut spirals and strips on the machine. The invention integrates a strip cutter and a spiral cutter in a shredder tube shell, and integrates the two kinds of cuts with different output power modes to facilitate the conversion of the strip cutter and the spiral cutter. The invention has the advantages of simple overall structure, convenient operation and high safety performance.

It will be apparent to those skilled in the art that various modifications and variations can be made in the embodiments of the invention without departing from the scope of the claimed invention. Thus, it is intended that embodiments of the invention cover the modifications and variations of this invention provided they come within the scope of the appended claims and their equivalents.

REFERENCE NUMERALS 1 shredder tube
11 shredder tube shell
12 strip cutter supporter
13 strip cutter
14 spiral cutter supporter
15 spiral cutter
151 cutter disk
152 core cutter
153 slot
154 slice cutter supporter
155 slice cutter
156 triangle cutter
2 feed tube
3 body base
31 first limit block
32 second limit block
4 shredding cutter components
5 power unit
51 drive unit
511 motor
512 motor shell
513 motor lid
52 transmission unit 521 drive shaft
522 gear set
523 front bearing
524 rear bearing
525 gear set box
5251 third limit block
526 first bushing
527 second bushing
528 gear lid
6 connector
7 adjustment unit
71 upper cover base
72 locking device
73 locking device lid
74 first spring
75 spring rod
76 limit slider
77 second spring
8 pusher
81 first pusher
82 second pusher

What is claimed is:

1. A combined shredding and cutting component (4) for a rotary cutting machine, said component having a shredder tube (1) and a feed tube (2), wherein the feed tube is arranged perpendicular to the shredder tube;
   the shredder tube (1) comprising a strip cutter support (12) arranged within a shredder tube shell (11), the strip cutter support (12) having a strip cutter (13) provided on a side thereof and a spiral cutter support (14) provided on a bottom surface thereof; and
   wherein a spiral cutter (15) is provided on the spiral cutter support such that the strip cutter (13) and the spiral cutter (15) are positioned perpendicular to each other.

2. The combined shredding and cutting component of claim 1, wherein the strip cutter support (12) comprises a cylinder that is open at both ends with two installation positions symmetrically provided on the side wall of the cylinder for installing the strip cutter (13); and wherein the shape of the strip cutter is complementary to the installation positions on the side wall of the cylinder.

3. The combined shredding and cutting component of claim 1, wherein the spiral cutter (15) comprises:
   a cutter disk (151) configured to be received on the spiral cutter support (14);
   a core cutter (152) protruding from the cutter disk (151) along a central axis thereof;
   a slot (153) formed between an outer edge of the cutter disk (151) and the core cutter (152):
   a slice cutter support (154) protruding from the cutter disk (151) along a first side of the slot (153);
   a slice cutter (155) arranged on the slice cutter support (154) parallel to the cutter disk (151);
   a triangle cutter (156) arranged equidistant from and parallel to slice cutter support (154) on a second side of the slot (153); and
   wherein the triangle cutter and the slice cutter are arranged perpendicular to each other.

4. The combined shredding and cutting component of claim 2, wherein the spiral cutter (15) comprises:
   a cutter disk (151) configured to be received on the spiral cutter support (14);
   a core cutter (152) protruding from the cutter disk (151) along a central axis thereof;
   a slot (153) formed between an outer edge of the cutter disk (151) and the core cutter (152):
   a slice cutter support (154) protruding from the cutter disk (151) along a first side of the slot (153);
   a slice cutter (155) arranged on the slice cutter support (154) parallel to the cutter disk (151);
   a triangle cutter (156) arranged equidistant from and parallel to slice cutter support (154) on a second side of the slot (153); and
   wherein the triangle cutter and the slice cutter are arranged perpendicular to each other.

5. A rotary cutting machine comprising a body base (3) and a combined shredding and cutting component (4) according to claim 1,
   wherein the body base comprises a power unit (5) that drives the combined shredding cutter component (4) via a motor axis connected to the combined shredding cutter component (4) by a connector (6) provided on one side of the shredder tube (1);
   and wherein the body base (3) is configured to allow the combined shredding cutter component (4) to be rotated about the motor axis by 90°.

6. A rotary cutting machine comprising a body base (3) and a combined shredding and cutting component (4) according to claim 2,
   wherein the body base comprises a power unit (5) that drives the combined shredding cutter component (4) via a motor axis connected to the combined shredding cutter component (4) by a connector (6) provided on one side of the shredder tube (1);
   and wherein the body base (3) is configured to allow the combined shredding cutter component (4) to be rotated about the motor axis by 90°.

7. A rotary cutting machine comprising a body base (3) and a combined shredding and cutting component (4) according to claim 3,
   wherein the body base comprises a power unit (5) that drives the combined shredding cutter component (4) via a motor axis connected to the combined shredding cutter component (4) by a connector (6) provided on one side of the shredder tube (1);
   and wherein the body base (3) is configured to allow the combined shredding cutter component (4) to be rotated about the motor axis by 90°.

8. A rotary cutting machine comprising a body base (3) and a combined shredding and cutting component (4) according to claim 4,
   wherein the body base comprises a power unit (5) that drives the combined shredding cutter component (4) via a motor axis connected to the combined shredding cutter component (4) by a connector (6) provided on one side of the shredder tube (1);
   and wherein the body base (3) is configured to allow the combined shredding cutter component (4) to be rotated about the motor axis by 90°.

9. The rotary cutting machine of claim 5, wherein the power unit (5) comprises a drive unit (51) and a transmission unit (52) with a gear set box (525), and the transmission unit connects the drive unit (51) and the connector (6).

10. The rotary cutting machine of claim 6, wherein the power unit (5) comprises a drive unit (51) and a transmission unit (52) with a gear set box (525), and the transmission unit connects the drive unit (51) and the connector (6).

11. The rotary cutting machine of claim 9, wherein the drive unit (51) includes a motor (511), a motor shell (512) and a motor lid (513); and
   wherein the motor lid (513) is attached to the motor shell (512), and the motor shell (512) is fixed on the body base (3).

12. The rotary cutting machine of claim 11, wherein the transmission unit (52) comprises a drive shaft (521) connected with the motor (511), and a gear set (522) that meshes with the connector (6).

13. The rotary cutting machine of claim 12, wherein the gear set is arranged in parallel with the drive shaft (521), and a front bearing (523) and a rear bearing (524) are respectively arranged at the front and the rear ends of the drive shaft.

14. The rotary cutting machine of claim 12, wherein the gear set (522) is housed within the complementary gear set box (525);
   a first bushing (526) and a second bushing (527) are arranged on either side of the gear set box; and
   a gear lid (528) is arranged between the first bushing (526) and connector (6), and the gear set box (525) is fixed on the body base (3).

15. The rotary cutting machine of claim 13, wherein the gear set (522) is housed within the complementary gear set box (525);
   a first bushing (526) and a second bushing (527) are arranged on either side of the gear set box; and
   a gear lid (528) is arranged between the first bushing (526) and connector (6), and the gear set box (525) is fixed on the body base (3).

16. The rotary cutting machine of claim 9, wherein a first limit block (31) and a second limit block (32) are provided on the body base (3) so as to form an arc angle of 90°; and wherein a third limit block (5251), arranged on outside of the gear set box (525), is configured to interact with the first and second limit blocks (31, 32) so as to limit the rotation of the gear set box (525) relative to the body base (3) to a 0-90° free rotation between the first limit block (31) and the second limit block (32).

17. The rotary cutting machine of claim 5, wherein an adjustment unit (7), arranged on the outer periphery of the shredder tube shell (11), comprises:
   an upper cover base (71) provided on the shredder tube shell (11), with one end of the upper cover base extending beyond the strip cutter support (12) and the other end of the upper cover base is connected to the feed tube (2);
   a locking device (72) arranged on the upper cover base (71), the locking device having a spring rod (75) sheathed with a first spring (74) and a locking device lid (73) having a limit slider (76) with a second spring (77).

18. The rotary cutting machine of claim 6, wherein an adjustment unit (7), arranged on the outer periphery of the shredder tube shell (11), comprises:
   an upper cover base (71) provided on the shredder tube shell (11), with one end of the upper cover base extending beyond the strip cutter support (12) and the other end of the upper cover base is connected to the feed tube (2);
   a locking device (72) arranged on the upper cover base (71), the locking device having a spring rod (75) sheathed with a first spring (74) and a locking device lid (73) having a limit slider (76) with a second spring (77).

19. The rotary cutting machine of claim 5, wherein the feed tube is provided with a complementary pusher (8).

20. The rotary cutting machine of claim 19, wherein the pusher (8) comprises a first pusher element (81) and a second pusher element (82) matched with the size of the food to be processed, said first pusher element (81) configured to be sheathed in the second pusher element (82).

\* \* \* \* \*